US009781098B2

United States Patent
Mohamad Abdul et al.

(10) Patent No.: US 9,781,098 B2
(45) Date of Patent: Oct. 3, 2017

(54) GENERIC SERVER FRAMEWORK FOR DEVICE AUTHENTICATION AND MANAGEMENT AND A GENERIC FRAMEWORK FOR ENDPOINT COMMAND DISPATCH

(71) Applicant: Oracle International Corporation, Redwood Shores, CA (US)

(72) Inventors: Mohamad Raja Gani Mohamad Abdul, Belmont, CA (US); Bhagavati Kumar Jayanti Venkata, Bangalore (IN); Krithiga Gopalan, Geneva (CH); Harsh Maheshwari, Indore (IN); Nagaraj Pattar, Gulbarga (IN); Ravi Verma, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 99 days.

(21) Appl. No.: 14/689,983

(22) Filed: Apr. 17, 2015

(65) Prior Publication Data
US 2016/0087955 A1 Mar. 24, 2016

Related U.S. Application Data

(60) Provisional application No. 62/054,544, filed on Sep. 24, 2014.

(51) Int. Cl.
*H04L 9/32* (2006.01)
*H04L 9/00* (2006.01)
(Continued)

(52) U.S. Cl.
CPC .......... *H04L 63/0823* (2013.01); *G06F 8/60* (2013.01); *G06F 8/61* (2013.01); *G06F 8/71* (2013.01);
(Continued)

(58) Field of Classification Search
CPC . H04L 63/08; H04L 63/0853; H04L 63/0869; H04L 63/0876; G06F 21/31;
(Continued)

(56) References Cited

U.S. PATENT DOCUMENTS 7,080,078 B1 * 7/2006 Slaughter ............... G06F 9/465
7,620,001 B2 11/2009 Ganji
(Continued)

FOREIGN PATENT DOCUMENTS

| CN | 106605210 | 4/2017 |
|---|---|---|
| EP | 2 282 477 A1 | 2/2011 |

(Continued)

OTHER PUBLICATIONS

International Application No. PCT/US2015/026596; Written Opinion mailed on Aug. 22, 2016, 7 pages.
(Continued)

*Primary Examiner* — Hosuk Song
(74) *Attorney, Agent, or Firm* — Kilpatrick Townsend and Stockton LLP

(57) ABSTRACT

Methods, devices, and systems are described for enrolling a user's bring-your-own-device for secure connection to a company's enterprise computer network. From her mobile device, user clicks on a uniform resource locator (URL) to connect with the login web page on the enterprise network. After authentication, checks are performed to verify that the user has authorization to enroll the type of electronic device, and the profile is installed on the device. A notification is sent to the device by a server on the enterprise network, and a secure workspace application is pushed to the device along with configuration data that automatically links the workspace with the parent device enrollment. Once the user launches the secure workspace application the workspace access configuration data and initializes enrollment with the
(Continued)

enterprise network, resulting in a linking of the secure workspace application with its parent device enrollment. The workspace is registered as a child of the parent device, and the lifecycle of the workspace is thus linked to that of the parent.

20 Claims, 10 Drawing Sheets

(51) Int. Cl.
    *H04L 29/06*     (2006.01)
    *G06F 9/445*     (2006.01)
    *G06F 9/44*     (2006.01)
    *G06F 21/45*     (2013.01)
    *G06F 21/30*     (2013.01)
    *H04L 12/24*     (2006.01)
    *G06F 21/31*     (2013.01)
    *H04L 29/08*     (2006.01)
    *H04W 4/00*     (2009.01)
    *H04W 12/08*     (2009.01)
    *H04W 28/08*     (2009.01)
    *H04L 12/803*     (2013.01)
    *H04W 12/06*     (2009.01)
    *H04W 16/06*     (2009.01)
    *H04W 4/08*     (2009.01)

(52) U.S. Cl.
    CPC .............. *G06F 21/30* (2013.01); *G06F 21/31* (2013.01); *G06F 21/45* (2013.01); *H04L 9/3268* (2013.01); *H04L 41/20* (2013.01); *H04L 41/28* (2013.01); *H04L 47/125* (2013.01); *H04L 63/08* (2013.01); *H04L 63/083* (2013.01); *H04L 63/0876* (2013.01); *H04L 63/10* (2013.01); *H04L 63/101* (2013.01); *H04L 63/102* (2013.01); *H04L 63/104* (2013.01); *H04L 63/105* (2013.01); *H04L 63/20* (2013.01); *H04L 63/205* (2013.01); *H04L 67/02* (2013.01); *H04L 67/10* (2013.01); *H04L 67/26* (2013.01); *H04L 67/306* (2013.01); *H04W 4/001* (2013.01); *H04W 4/003* (2013.01); *H04W 12/06* (2013.01); *H04W 12/08* (2013.01); *H04W 16/06* (2013.01); *H04W 28/08* (2013.01); *G06F 9/4445* (2013.01); *H04L 41/082* (2013.01); *H04L 41/5096* (2013.01); *H04W 4/08* (2013.01)

(58) Field of Classification Search
    CPC ........ G06F 21/44; G06F 21/71; G06F 21/445; G06F 21/121
    USPC .............. 713/168–170, 193; 726/2–7, 26–30
    See application file for complete search history.

(56) References Cited

U.S. PATENT DOCUMENTS

| | | | |
|---|---|---|---|
| 7,707,643 B2* | 4/2010 | DeMello | G06F 21/10 726/27 |
| 7,711,796 B2 | 5/2010 | Gutt et al. | |
| 7,746,851 B2 | 6/2010 | Chandrasiri et al. | |
| 7,886,033 B2 | 2/2011 | Hopmann et al. | |
| 7,925,729 B2 | 4/2011 | Bush et al. | |
| 8,086,233 B2 | 12/2011 | Millet et al. | |
| 8,281,010 B2 | 10/2012 | Ansari et al. | |
| 8,359,016 B2 | 1/2013 | Lindeman et al. | |
| 8,572,676 B2 | 10/2013 | Sapp et al. | |
| 8,583,683 B2* | 11/2013 | Rathod | G06F 17/30867 707/770 |
| 8,595,186 B1 | 11/2013 | Mandyam et al. | |
| 8,688,147 B2 | 4/2014 | Nguyen et al. | |
| 8,769,270 B2* | 7/2014 | Orsini | G06F 21/6209 713/165 |
| 8,812,685 B2 | 8/2014 | Fuller | |
| 8,856,289 B2 | 10/2014 | Ansari et al. | |
| 8,935,275 B2* | 1/2015 | Rathod | G06F 17/30867 707/609 |
| 9,106,661 B1* | 8/2015 | Stamos | |
| 9,210,183 B2 | 12/2015 | Sadovsky et al. | |
| 9,535,675 B2 | 1/2017 | Mohamad Abdul et al. | |
| 2004/0054676 A1 | 3/2004 | McNally et al. | |
| 2005/0125509 A1 | 6/2005 | Ramachandran | |
| 2006/0048142 A1 | 3/2006 | Roese et al. | |
| 2007/0055752 A1 | 3/2007 | Wiegand et al. | |
| 2007/0093243 A1 | 4/2007 | Kapadekar et al. | |
| 2007/0243862 A1 | 10/2007 | Coskun et al. | |
| 2008/0168072 A1 | 7/2008 | Freedman | |
| 2009/0254392 A1 | 10/2009 | Zander | |
| 2009/0265701 A1 | 10/2009 | Naslavsky et al. | |
| 2009/0300742 A1 | 12/2009 | Ahn | |
| 2010/0114618 A1 | 5/2010 | Wilcock et al. | |
| 2010/0185263 A1 | 7/2010 | Stevenson et al. | |
| 2011/0282836 A1 | 11/2011 | Erickson et al. | |
| 2012/0084184 A1 | 4/2012 | Raleigh et al. | |
| 2012/0106399 A1 | 5/2012 | Abendroth et al. | |
| 2012/0131327 A1 | 5/2012 | Tomlinson | |
| 2012/0179802 A1 | 7/2012 | Narasimhan et al. | |
| 2012/0278454 A1 | 11/2012 | Stewart et al. | |
| 2012/0297444 A1 | 11/2012 | Kacherov et al. | |
| 2013/0219307 A1 | 8/2013 | Raber et al. | |
| 2013/0247028 A1 | 9/2013 | Brooks et al. | |
| 2013/0254834 A1 | 9/2013 | King | |
| 2013/0262626 A1 | 10/2013 | Bozek et al. | |
| 2014/0006347 A1 | 1/2014 | Qureshi et al. | |
| 2014/0007084 A1 | 1/2014 | Ding | |
| 2014/0007182 A1 | 1/2014 | Qureshi et al. | |
| 2014/0007183 A1 | 1/2014 | Qureshi et al. | |
| 2014/0007214 A1 | 1/2014 | Qureshi et al. | |
| 2014/0032759 A1 | 1/2014 | Barton et al. | |
| 2014/0040975 A1 | 2/2014 | Raleigh et al. | |
| 2014/0068030 A1 | 3/2014 | Chambers et al. | |
| 2014/0108801 A1 | 4/2014 | McBride et al. | |
| 2014/0113593 A1 | 4/2014 | Zhou et al. | |
| 2014/0162614 A1 | 6/2014 | Lindeman et al. | |
| 2014/0172799 A1 | 6/2014 | Dorman | |
| 2014/0199962 A1 | 7/2014 | Mohammed et al. | |
| 2014/0207220 A1 | 7/2014 | Boling et al. | |
| 2014/0259178 A1 | 9/2014 | Karaa et al. | |
| 2014/0280815 A1 | 9/2014 | Candelaria et al. | |
| 2014/0337528 A1 | 11/2014 | Barton et al. | |
| 2015/0009533 A1 | 1/2015 | Anno et al. | |
| 2015/0070585 A1 | 3/2015 | Sharif-ahmadi et al. | |
| 2015/0156122 A1 | 6/2015 | Singh et al. | |
| 2015/0249684 A1 | 9/2015 | Zhang et al. | |
| 2015/0278245 A1 | 10/2015 | Sagar et al. | |
| 2015/0281087 A1 | 10/2015 | Jalan et al. | |
| 2015/0302338 A1 | 10/2015 | Zaveri | |
| 2015/0304891 A1 | 10/2015 | Dinan | |
| 2016/0085533 A1 | 3/2016 | Jayanti Venkata et al. | |
| 2016/0087854 A1 | 3/2016 | Jayanti Venkata et al. | |
| 2016/0087956 A1 | 3/2016 | Maheshwari et al. | |
| 2016/0088021 A1 | 3/2016 | Jayanti Venkata et al. | |
| 2016/0088026 A1 | 3/2016 | Mohamad Abdul et al. | |
| 2016/0199658 A1 | 7/2016 | Nassif et al. | |
| 2017/0063846 A1 | 3/2017 | Mohamad Abdul et al. | |

FOREIGN PATENT DOCUMENTS

| | | |
|---|---|---|
| EP | 2 676 497 A1 | 12/2013 |
| EP | 2 716 086 A1 | 4/2014 |
| EP | 2 759 154 A1 | 7/2014 |
| EP | 2757471 | 7/2014 |
| WO | 2008/016580 A1 | 2/2008 |
| WO | 2011123328 | 10/2011 |
| WO | 2012/109751 A1 | 8/2012 |
| WO | 2012/164287 A1 | 12/2012 |
| WO | 2013/041849 A1 | 3/2013 |
| WO | 2014/036296 A1 | 3/2014 |

(56) References Cited

FOREIGN PATENT DOCUMENTS

| WO | 2014/047168 A1 | 3/2014 |
|---|---|---|
| WO | 2016048414 | 3/2016 |
| WO | 2016048415 | 3/2016 |
| WO | 2016048416 | 3/2016 |
| WO | 2016048417 | 3/2016 |

OTHER PUBLICATIONS

International Application No. PCT/US2015/026697, Interational Preliminary Report on Patentability mailed on Sep. 2, 2016, 10 pages.
U.S. Appl. No. 14/689,733, Notice of Allowance mailed on Aug. 29, 2016, 5 pages.
U.S. Appl. No. 14/690,034, Final Office Action mailed on Sep. 16, 2016, 12 pages.
International Application No. PCT/US2015/026594, International Search Report and Written Opinion mailed on Aug. 10, 2015, 15 pages.
International Application No. PCT/US2015/026596, International Search Report and Written Opinion mailed on Aug. 14, 2015, 13 pages.
International Application No. PCT/US2015/026697, International Search Report and Written Opinion mailed on Jul. 24, 2015, 11 pages.
International Application No. PCT/US2015/026699, International Search Report and Written Opinion mailed on Aug. 6, 2015, 11 pages.
International Application No. PCT/US2015/026697, Written Opinion mailed on Apr. 4, 2016, 8 pages.
U.S. Appl. No. 14/689,722, Non-Final Office Action mailed on Jun. 7, 2016, 20 pages.
U.S. Appl. No. 14/689,733, Non-Final Office Action mailed on Jun. 2, 2016, 6 pages.
U.S. Appl. No. 14/690,034, Non-Final Office Action mailed on May 19, 2016, 15 pages.
Chanliau, "Extending Enterprise Access and Governance with Oracle Mobile Security," Oracle Fusion Middleware, An Oracle White Paper, Mar. 2014, 29 pages.
"Can you pre-configure an app before deployment?" Enterprise iOS Forums, http://www.enterpriseios.com/forum/topic/Can_you_pre_configure_an_app_before_deployment, Jan. 25, 2013, 2 pages.
"Complete Mobility Management Solutions of Apple iOS," Apple iOS Device Management, http://www.air-watch.com/solutions/apple-ios/, retrieved Mar. 23, 2015, 5 pages.
"Complete Mobility Management Solutions for Samsung SAFE and KNOX Devices," Samsung for Enterprise (SAFE) Management, http://www.air-watch.com/solutions/android/samsung-for-enterprise/ retrieved Mar. 23, 2015, 4 pages.
"Comprehensive App, Security, Management and Deployment," AirWatch Mobile Application Management, http://www.air-watch.com/solutions/mobile-application-management/, retrieved Mar. 23, 2015, 6 pages.
"Comprehensive Security, Management and User Enablement for Android," AirWatch for Android Devices, http://www.air-watch.com/solutions/android/, retrieved Mar. 23, 2015, 3 pages.
"Configure and enforce policies across compatible IronKey secure USB mobile storage devices," Access Management Software, http://www.ironkey.com/en-us/access/enterprise/, © 2015 Imation Corp., retrieved Mar. 23, 2015, 3 pages.
"Flexible Containerization for Your Mobile Deployment," AirWatch Workspace Management, http://www.air-watch.com/solutions/containerization/, retrieved Mar. 24, 2015, 2 pages.
"Manage Mobile Devices with Configuration Manager and Microsoft Intune," https://technet.microsoft.com/en-us/library/jj884158.aspx, updated Mar. 3, 2015, 5 pages.
"Mobile Device Management for iOS, Android & Windows," Mobile Device Management (MDM), https://www.manageengine.com/products/desktop-central/mobile-device-management-mdm.html, retrieved Mar. 25, 2015, 4 pages.
StackOverflow-iphone plist, available online at http://stackoverflow.com/questions/1756636/what-is-the-use-of-plist, 2009, 2 pages.
Firtman, Programming the Mobile Web, Publisher: O'Reilly Media, 2010, 4 pages.
U.S. Appl. No. 14/689,722, Final Office Action mailed on Dec. 15, 2016, 25 pages.
U.S. Appl. No. 14/689,733, Supplemental Notice of Allowance mailed on Dec. 1, 2016, 2 pages.
U.S. Appl. No. 14/690,062, Non-Final Office Action mailed on Nov. 10, 2016, 5 pages.
U.S. Appl. No. 14/690,034, Notice of Allowance mailed on Jan. 5, 2017, 7 pages.
International Application No. PCT/US2015/026596, International Preliminary Report on Patentability mailed on Nov. 22, 2016, 11 pages.
International Application No. PCT/US2015/026699, International Preliminary Report on Patentability mailed on Nov. 10, 2016, 9 pages.
U.S. Appl. No. 14/690,045, Ex Parte Quayle Action mailed on Feb. 24, 2017, 8 pages.
U.S. Appl. No. 14/690,062, Notice of Allowance dated Feb. 23, 2017, 8 pages.
U.S. Appl. No. 15/347,152, Non-Final Office Action dated Feb. 27, 2017, 7 pages.
International Application No. PCT/US2015/026594, International Preliminary Report on Patentability dated Apr. 6, 2017, 13 pages.
U.S. Appl. No. 14/690,045, Notice of Allowance dated Apr. 26, 2017, 5 pages.
U.S. Appl. No. 14/689,722 Notice of Allowance dated May 5, 2017, 20 pages.

\* cited by examiner

GENERIC SERVER FRAMEWORK FOR DEVICE AUTHENTICATION AND MANAGEMENT AND A GENERIC FRAMEWORK FOR ENDPOINT COMMAND DISPATCH

CROSS-REFERENCES TO RELATED APPLICATIONS

This application claims the benefit of U.S. Provisional Application No. 62/054,544, filed Sep. 24, 2014, which is hereby incorporated by reference in its entirety for all purposes.

BACKGROUND

1. Field of the Art

Generally, this application relates to data processing and computer networking. Certain embodiments relate to methods, devices, and systems for establishing secure connections between mobile or other electronic devices and enterprise computer networks.

2. Background

Convenient access by employees to enterprise network resources is a recurring problem, especially with mobile devices. Once a mobile device management (MDM) solution is installed on a mobile device, just about everything on the mobile device becomes enterprise data. This can be sub-optimal if a user of the mobile device wishes to use it for non-enterprise purposes.

Applications, or "apps" as they are sometimes referred to, are updated and revised frequently. It is not uncommon for an email application to be subject to an update patch every few months. Mobile devices and other computing devices often have many apps, each of which is updated frequently. This can make securing the mobile device from hackers difficult because a computing device is generally only as secure as its weakest link. If one application suffers from a security anomaly, potentially all of the data on the device may be compromised.

Because of these security vulnerabilities, many companies do not allow access by employees' own devices, commonly called bring-your-own-device (BYOD) access, to their corporate networks. Unless the employees consent to the MDM solution described above, which locks down everything on the user's device, corporations have not embraced a BYOD philosophy. An alternative is for employers to provide electronic devices to employees for enterprise access; however, this is costly and requires infrastructure to update.

Installing secure solutions on the various devices—that have different operating systems, memory sizes, and graphics abilities—can be daunting for an IT department, let alone a user. Users often do not have the expertise to troubleshoot their own devices, and there are just too many devices for IT departments to keep up.

Better security, flexibility, and integration of apps on mobile devices for connection to an enterprise network is needed.

BRIEF SUMMARY

Generally, a self-connection system for connecting one's bring-your-own-device (BYOD) to a company's enterprise computer network and installing a secure workspace application is described. The user is provided a uniform resource locator (URL) or other link through short message service (SMS), multimedia messaging service (MMS), email, etc. to the user. The user clicks on the link on his or her device, and the link connects with the company network to a login page or other authentication scheme. The user logs in to be authenticated, and a profile is sent to the user's electronic device. A server on the enterprise network posts a notification for the device, and the device checks for notifications. When inquired by the device, the server sends a command to install a secure workspace application to the device. The server can check to see whether the user's role permits him or her to use the particular operating system (OS), including version number, etc. on the company network. Some OS versions may not be allowed. A device agent can then use the information in the command payload to download the secure workspace application to the device. When the secure workspace application on the user's electronic device is launched by the user, it connects with the enterprise network to complete its initialization.

The secure workspace application is used with other apps on the device to encrypt and decrypt transmissions between the device and the corporate network. Further, the secure workspace application can enforce policies on the device, such as policies for encrypting data before storing it, preventing printing of some sensitive information from the company, turning on tracking data if the device is lost, or other policies.

Some embodiments of the invention are related to a method of initializing a user's electronic device for secure connection to an enterprise computer network. The method includes sending, to a user's electronic device, a uniform resource locator (URL) that links to an enterprise computer network, authenticating a user of the electronic device to the enterprise computer network, the user connecting the electronic device to the enterprise computer network using the URL, installing a profile on the user's electronic device in response to the authenticating, the profile associated with the user, posting, on a server of the enterprise network, an enrollment notification for the electronic device, detecting, on the enterprise network, an inquiry for notifications from the electronic device, pushing, from the enterprise computer network to the electronic device, a secure workspace application and a configuration for the secure workspace application in response to the detecting, the secure workspace application selected based on a device identifier of the electronic device and the profile, and automatically enrolling the secure workspace application with the enterprise computer network as a child of the user's electronic device upon the secure workspace application being started on the user's electronic device.

The method can include transmitting data from the enterprise computer network to the electronic device for viewing in an app, decrypting, by the secure workspace application, the data, and passing the decrypted data to the app for viewing by the user. The method can include encrypting, by the secure workspace application, data from an app on the electronic device, and transmitting, from the electronic device to the enterprise computer network, the encrypted data. The method can include determining an operating system (OS) of the electronic device, wherein the secure workspace application is selected based on the determined OS. The OS can be selected from the group consisting of Apple iOS®, Google Android®, and Microsoft Windows Mobile®. The automatic installing can be based on the determined OS. The method can include correlating the role of the user with the OS of the electronic device, wherein the enrolling is based upon a pre-approval of the OS correlated with the role.

The user can be associated with a role in the enterprise computer network, the enrolling based upon the role. The sending of the URL can be through a short message service (SMS) or multimedia messaging service (MMS). And/or the sending of the URL can be through an email to the user. The type of authentication for the authenticating can be selected based on a policy in the enterprise computer network. The type of authentication can include a username and password on a hypertext transfer protocol (HTTP) web form.

Yet other embodiments relate to systems executing the above-referenced methods and machine-readable tangible storage media that employ or store instructions for the methods described above.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Systems depicted in some of the figures may be provided in various configurations. In some embodiments, the systems may be configured as a distributed system where one or more components of the system are distributed across one or more networks in a cloud computing system.

The registration/enrollment for iOS devices can use an Apple proprietary protocol.

The OTA (Over-The-Air) enrollment should both authenticate the user as well as the device identity and ensure that only desired devices are enrolled in the system.

A Generic Server Framework for Device Authentication and Management

A generic server side framework to authenticate, fingerprint, provision identity, enroll (for management), control (via policies) and monitor devices of various types is described. The term "endpoint" can be used to mean a managed device which could be a smart phone, or a sandboxed workspace in a smart phone, an application hosted on a smart phone, an IOT gateway, an IOT edge device, or as otherwise known in the art. Varied protocols can be supported for the enrollment depending on agent capabilities on the endpoint and end user associations (if any). The lifecycle of the enrollment and provisioned identities can be managed by the framework. The identities provisioned to the endpoints can be used to authenticate all further communications from the endpoint. While the focus may be on active fingerprinting, it also can support passive fingerprinting for endpoints that are not amenable to active enrollment and management.

Generic Framework for Endpoint Command Dispatch

A Mobile Security Manager (MSM), sometimes referred to as a MIM, can manage a variety of endpoints (e.g., devices, workspaces, IoT devices) on different platforms. Each of these endpoints have their own commands for performing operations—lock, sync, wipe, install app etc. Also, each endpoint type has its own notification mechanism—APNS, GCM, Server Polling etc. A generic framework abstracts the differences between the endpoint specific commands and the notification mechanism. This makes the server endpoint agnostic and allows one to easily support new endpoint types.

Figure 1:
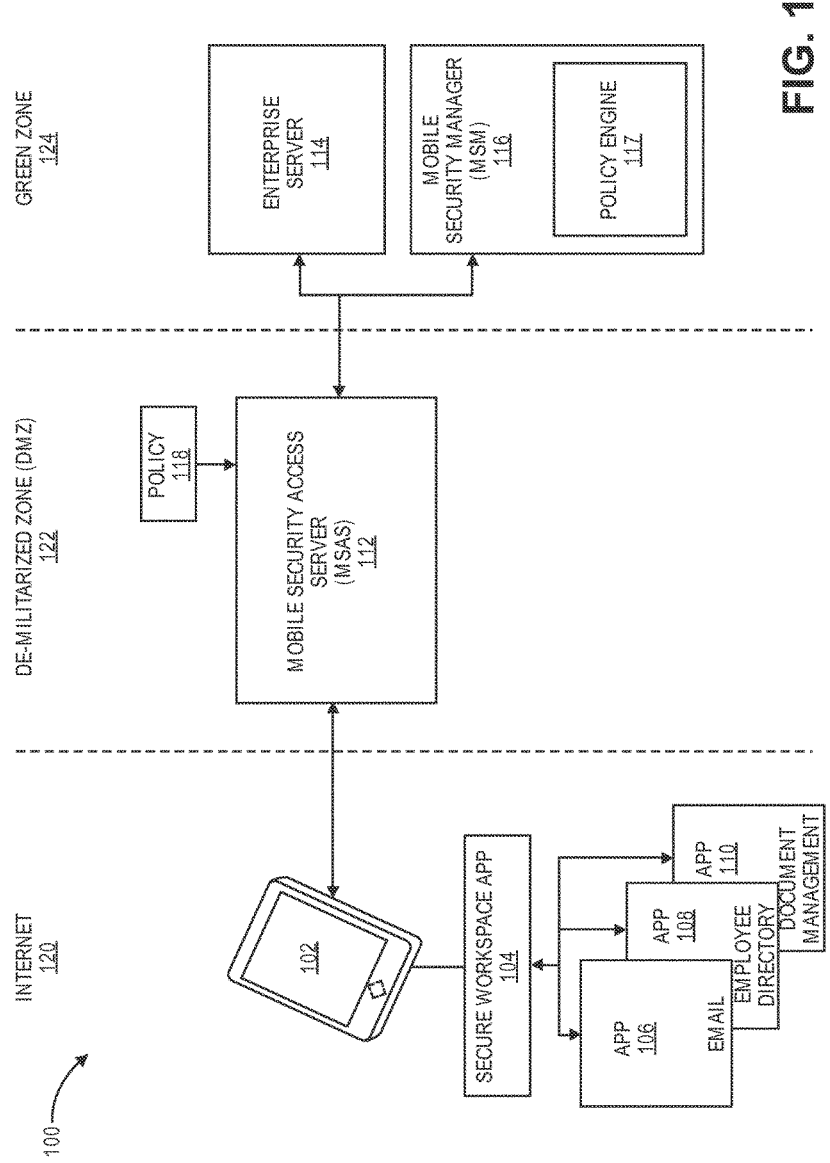
FIG. 1 illustrates a mobile device connecting with a company's enterprise network in accordance with an embodiment.

FIG. 1 illustrates a mobile device connecting with a company's enterprise network in accordance with an embodiment. In system 100, mobile smart phone 102 is connected through a firewall from Internet 120 to demilitarized zone (DMZ) 122 of a corporate enterprise computer network. Smart phone 102 specifically connects with mobile security access server (MSAS) 112, which in turn connects from DMZ 122 to company green zone 124.

MSAS 112 connects to enterprise server 114 and other enterprise resources as well as mobile security manager (MSM) 116.

Smart phone 102 hosts secure workspace application 104, which intercepts all traffic between phone 102 and the Internet for certain apps. These registered apps include email app 106, proprietary employee directory app 108, and document management app 110.

A user of device 102 can compose an email message in email app 106. When the user hits a send button, email app 106 packages the email and sends it to secure workspace app 104. It may do this with specialized code, wrapper code, or as otherwise known in the art. Workspace app 104 encrypts email message per policy 118. The policy may comprise an extensible markup language (XML) file or as otherwise known in the art. The encrypted email message is sent from secure workspace app 104 on smart phone 102 across Internet 120 to MSAS 112 in DMZ 122.

MSAS 112 participates in a negotiation protocol to obtain a credential appropriate for authenticating with an email service on enterprise server 114 in exchange for the credentials that were sent by email client app 106. MSAS 112 can also perform credential translations based on policies defined for various protected URLs. The email service on enterprise server 114 can then decrypt the email and send it out through the corporate email network.

MSM is not involved in application interactions. Rather, it primarily deals with enrollment and lifecycle management of the enrollment. Policy engine 117, which resides inside MSM server 116, authorizes an enrollment based on the OS, user-role, and other conditions.

Figure 2:
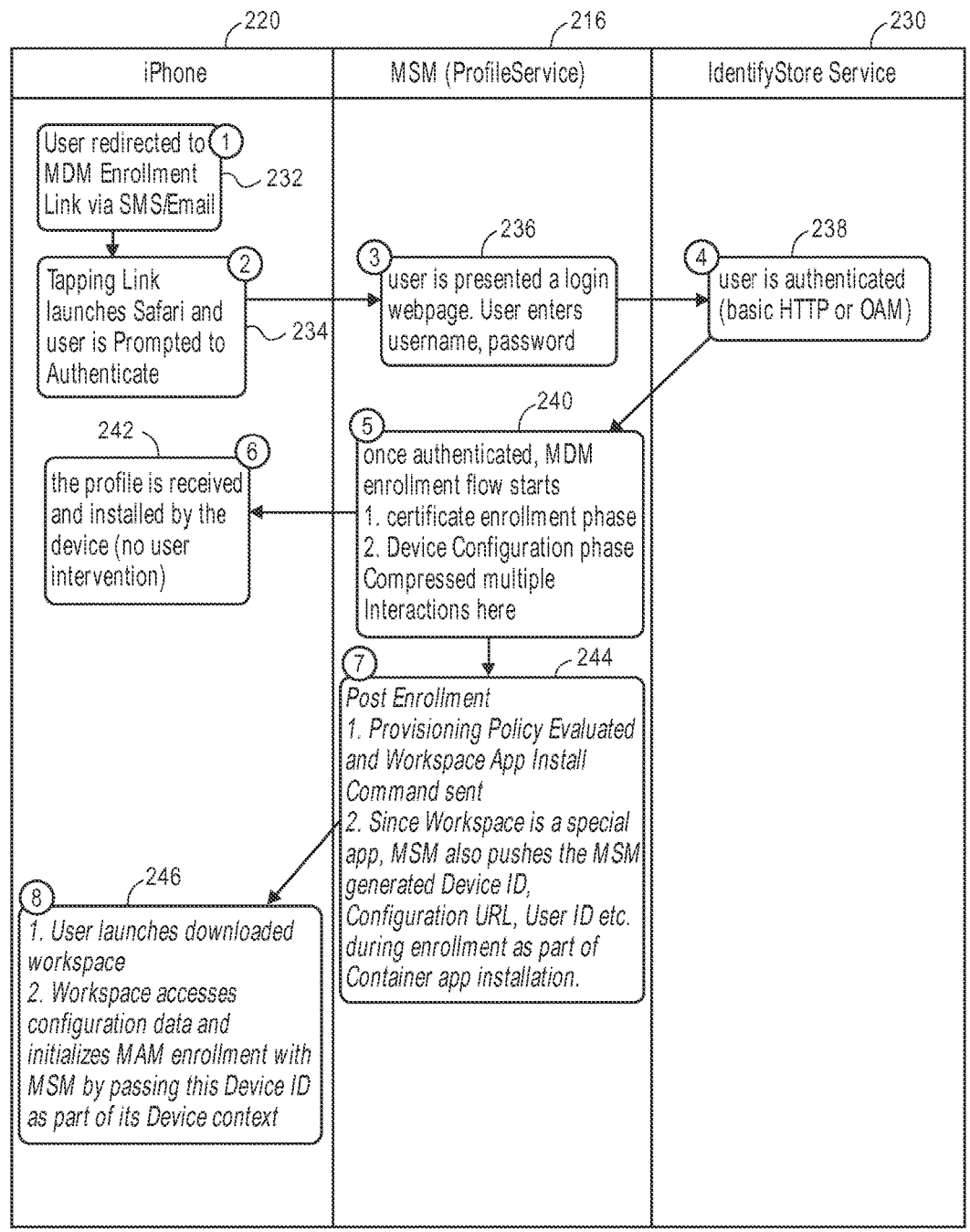
FIG. 2 illustrates enrollment of a user's Apple iPhone® cellular telephone with a company's enterprise network in accordance with an embodiment.

FIG. 2 illustrates enrollment of a user's Apple iPhone® cellular telephone with a company's enterprise network in accordance with an embodiment. In sequence 200, an Apple iPhone® device 220 connects with MSM 216 through ProfileService, to IdentityStore service 230. In operation 232, a user is redirected to a mobile device management (MDM) enrollment link via SMS or email. In operation 234, a user taps on a link to launch a Safari® web browser. The user is then prompted to authenticate. In operation 236, a user is presented a login web page. The user enters his or her username and password. In operation 238, the user is authenticated through basic hypertext transmission protocol (HTTP) or Oracle Access Manager (OAM).

In operation 240, once the user is authenticated, the MDM enrollment flow starts at MSM 216. First is a certificate enrollment phase, and second is a device configuration phase. Multiple interactions are compressed at this point.

In operation 242, the profile is received and installed by iPhone device 220. No user intervention is necessary because user consent is part of the profile installation.

Operation 244 occurs post enrollment at MSM 216. First, a provisioning policy is evaluated, and a workspace app install command is sent. Second, since a workspace is a special app, MSM 216 also pushes the MSM generated device identifier (ID), configuration uniform resource locator (URL), user ID, etc. during enrollment as part of a container app installation. At the iPhone device in operation 246, a user launches a downloaded workspace. The workspace accesses configuration data and initializes Mobile Application Management (MAM) enrollment with MSM 216 by passing the device ID as part of its device context.

Figure 3:
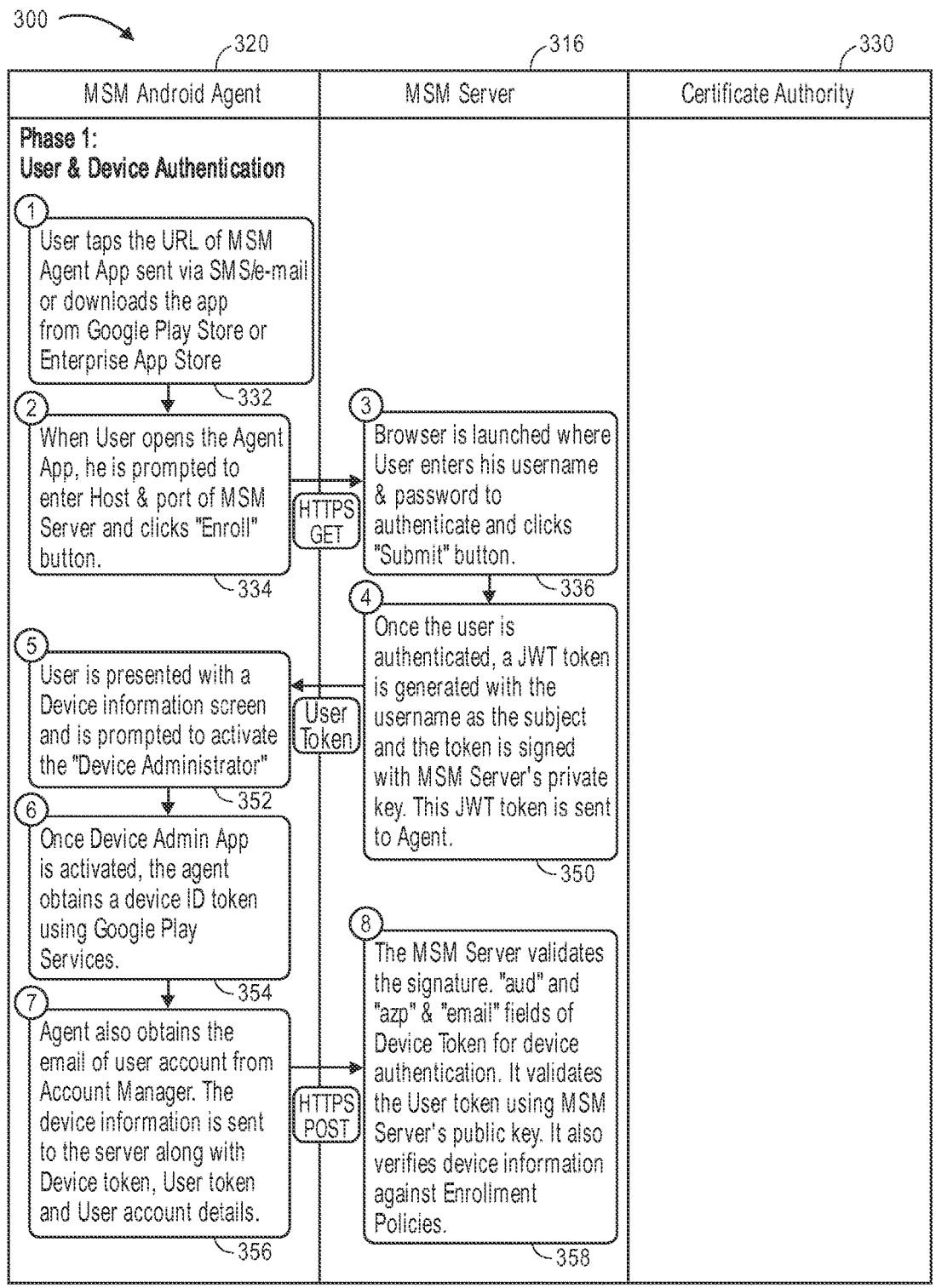
FIG. 3 illustrates user and device authentication of a user's Google Android® device with a company's enterprise network in accordance with an embodiment.

FIG. 3 illustrates user and device authentication of a user's Google Android® device with a company's enterprise network in accordance with an embodiment. In system 300, MSM Google Android® agent 320 on an Android device connects with MSM server 316, which in turn connects with certificate authority 330. Phase 1 is user and device authentication.

In operation 332, a user taps the URL of MSM agent app 320 that was sent via SMS or email. Alternatively, the user downloads the app from Google Play Store or Enterprise App Store. In operation 334, when the user opens the agent app, he or she is prompted to enter host and port information of the MSM server. The user can click an "Enroll" button. Upon the user clicking the "Enroll" button, device 320 connects to MSM server 316 through an HTTPS Get request.

In operation 336, a browser is launched where the user enters his or her username and password to authenticate. He or she then clicks a "Submit" button. In operation 350, once the user is authenticated, a JavaScript® Object Notation (JSON) Web Token (JWT) token is generated with the username as the subject. The token is signed with MSM Server 316's private key. This JWT token is then sent to agent 320. In operation 352 at the Android device, the user is presented with a device information screen and is prompted to activate the "Device Administrator." In operation 354, once the device admin app is activated, agent 320 obtains a device ID token using Google Play Services. In operation 356, agent 320 also obtains the email of the user's account from an account manager. The device information is sent to the server along with the device token, user token, and user account details.

In operation 358, MSM server 316 validates the signature, "aud" and "azp" and "email" fields of the device token for device authentication. It validates the user token using MSM server 316's public key. It also verifies device information against enrollment policies.

Figure 4:
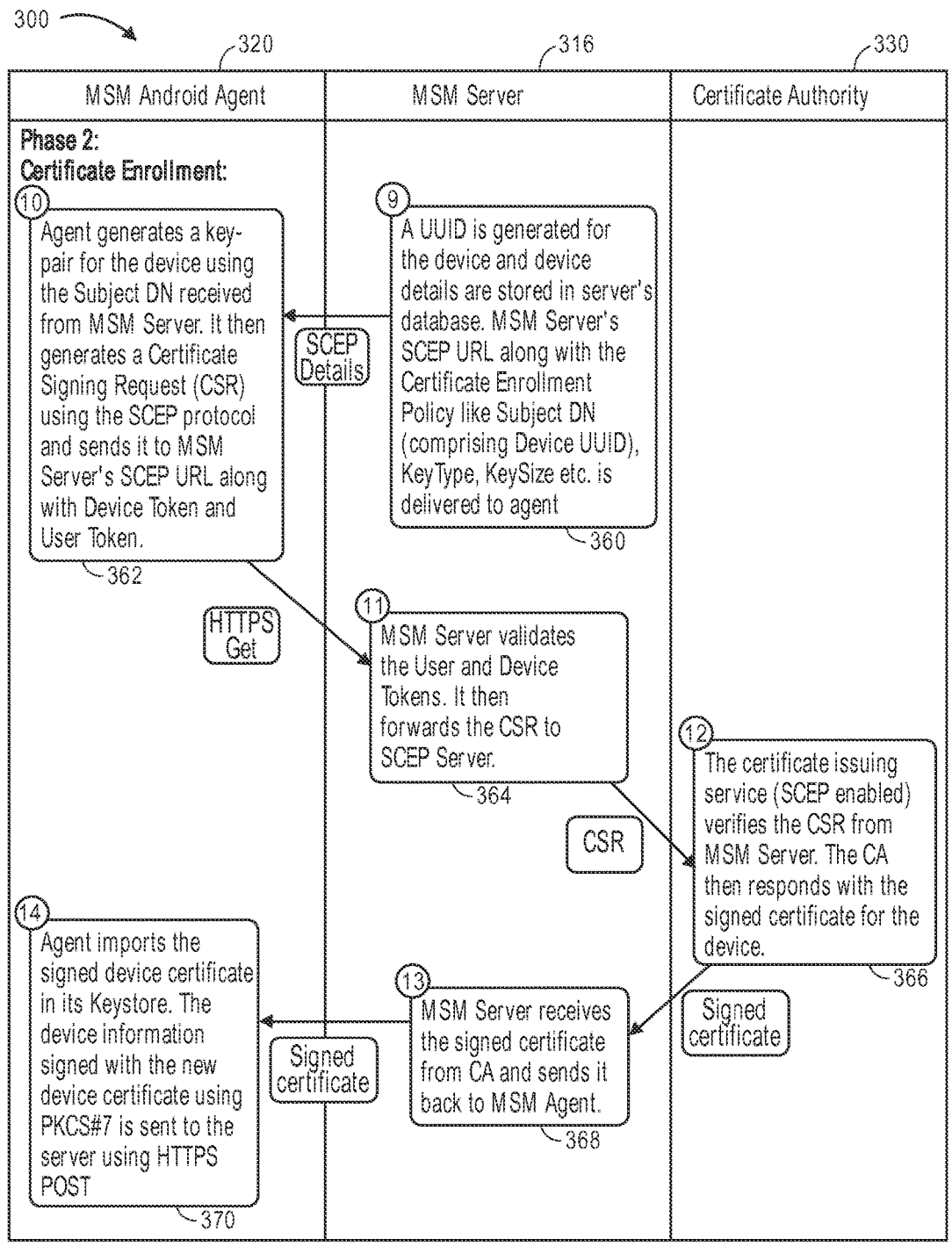
FIG. 4 illustrates certificate enrollment of a user's Google Android® device with a company's enterprise network in accordance with an embodiment.

FIG. 4 illustrates certificate enrollment of a user's Google Android® device with a company's enterprise network in accordance with an embodiment. The system is a continuation of system 300 in which MSM Google Android® agent 320 on an Android device connects with MSM server 316, which in turn connects with certificate authority 330. Phase 2 is certificate enrollment.

In operation 360 at MSM server 316, a universally unique identifier (UUID) is generated for the device, and device details are stored in the server's database. MSM server 316's SCEP URL along with the certificate enrollment policy-like subject distinguished name (DN) (comprising the device UUID), KeyType, KeySize, etc. are delivered to agent 320.

In operation 362 at MSM Android® agent 320, agent 320 generates a key-pair for the device using the subject DN received from MSM server 316. It then generates a certificate signing request (CSR) using the simple certificate enrollment protocol (SCEP) protocol and sends it to MSM server 316's SCEP URL along with the device token and user token.

In operation 364, through an HTTP Get request from MSM Android® agent 320 to MSM server 316, MSM server 316 validates the user and device tokens. It then forward the CSR to SCEP server 330.

In operation 366, the certificate issuing service (SCEP enabled) verifies the CSR from MSM server 316. The certificate authority then responds with the signed certificate for the device.

In operation 368, MSM server 316 receives the signed certificate from the certificate authority and sends it back to MSM agent 320.

In operation 370 at MSM agent 320, MSM agent 320 imports the signed device certificate in its keystore. The device information signed with the new device certificate using PKCS#7 (public key cryptography standard 7) is sent to the server using a HTTPS post request.

Figure 5:
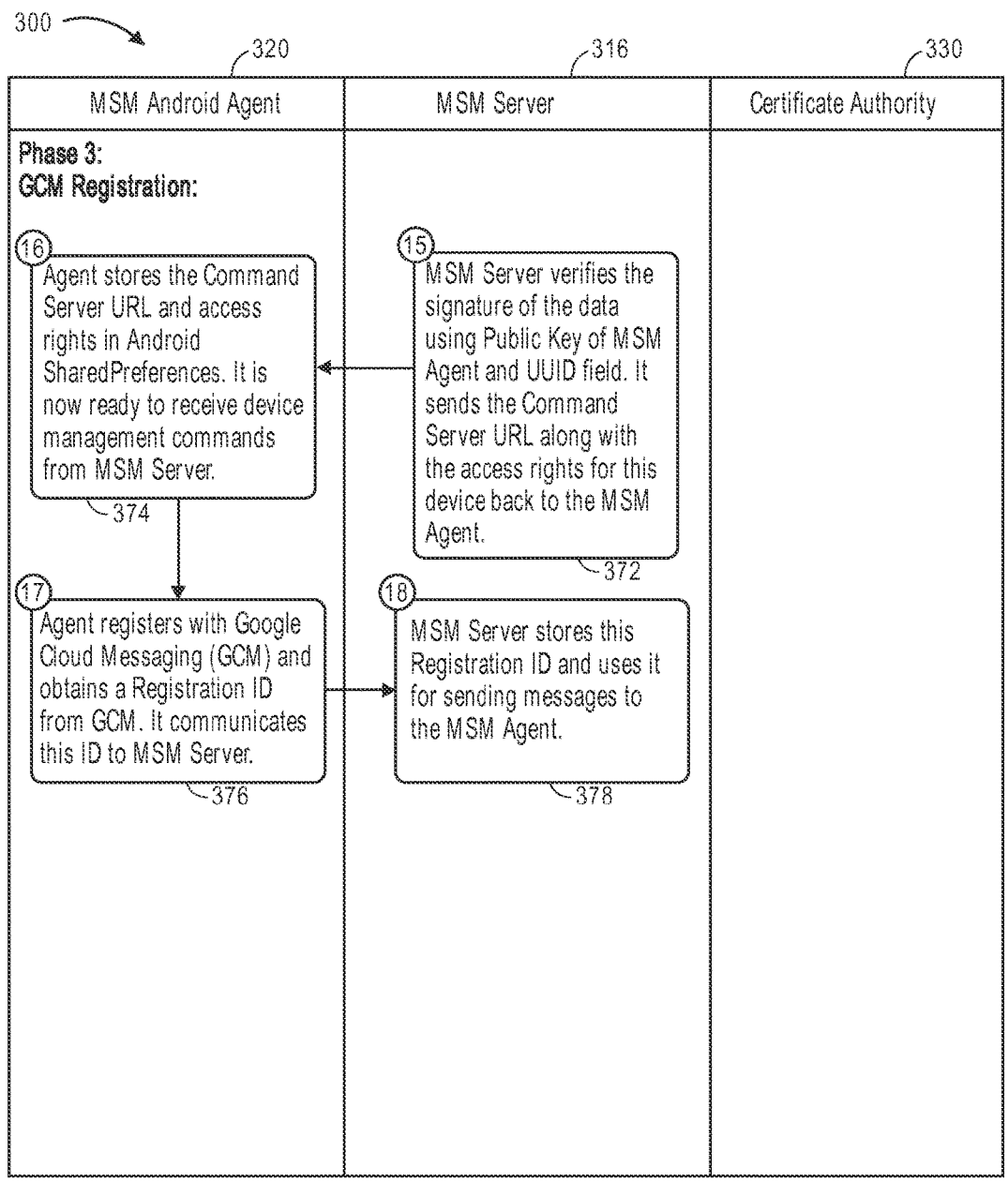
FIG. 5 illustrates Google Cloud Messaging (GCM) registration of a user's Google Android® device with a company's enterprise network in accordance with an embodiment.

FIG. 5 illustrates Google Cloud Messaging (GCM) registration of a user's Google Android® device with a company's enterprise network in accordance with an embodiment. The system is a continuation of system 300 in which MSM Google Android® agent 320 on an Android device connects with MSM server 316, which in turn connects with certificate authority 330. Phase 3 is Google Cloud Messaging (GCM) registration.

In operation 372, MSM server 316 verifies the signature of the data using the public key of MSM agent 320 and the UUID field. It sends the command server URL along with the access rights for this device back to MSM agent 320.

In operation 374, agent 320 stores the command server URL and access rights in Android SharedPreferences. It is now ready to receive device management commands from MSM server 316. In operation 376, agent 320 registers with Google Cloud Messaging (GCM) and obtains a registration ID from GCM. It communicates this ID to MSM server 316.

In operation 378, MSM server 316 stores this registration ID and uses it for sending messages to MSM agent 320.

Figure 6:
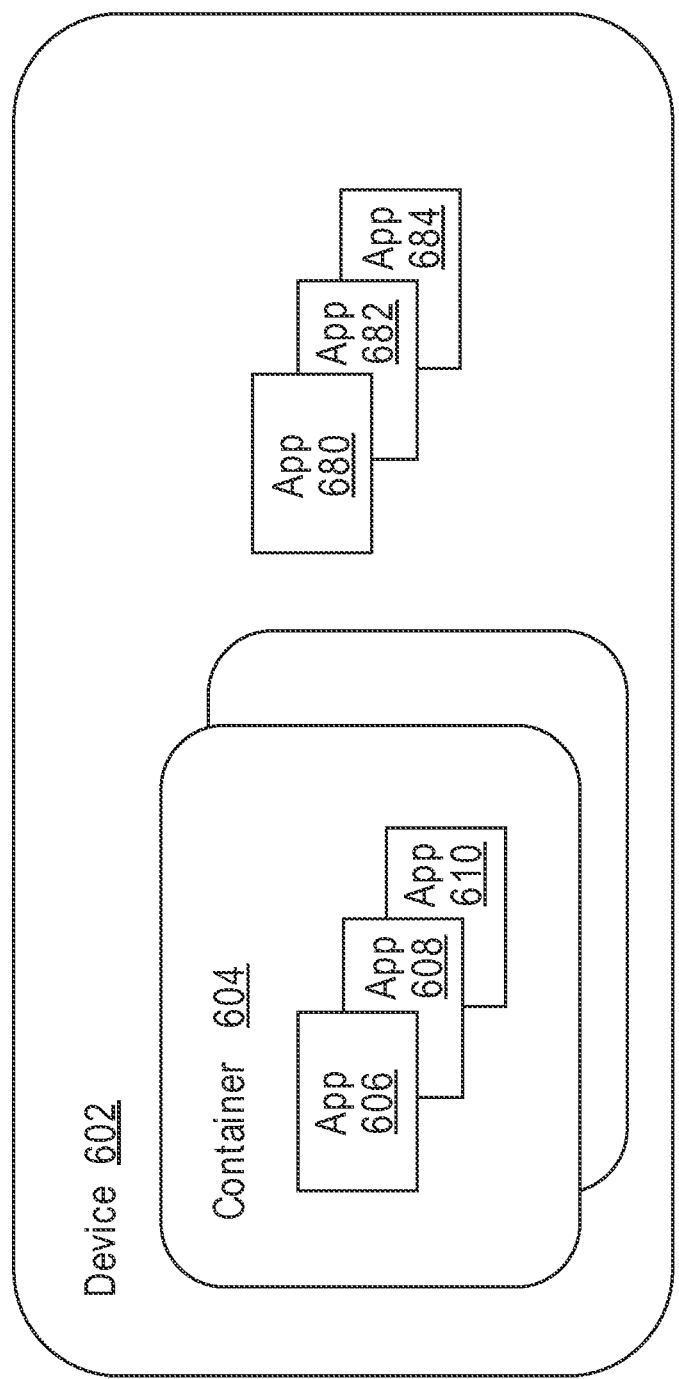
FIG. 6 illustrates a workspace hosting managed apps in accordance with an embodiment.

FIG. 6 illustrates a workspace hosting managed apps in accordance with an embodiment.

Endpoint

An Endpoint is a first-class, logical entity that represents any kind of mobile entity (mobile-device, secure-workspace, tablet, or managed application on a device) or an Internet of Things (IOT) device that can be managed by Oracle MSM. Endpoint can be a generic concept, and it may be possible to define new endpoint types.

The following information will almost always be maintained for an endpoint—
a. A unique identifier
b. Platform, Platform version—OS
c. Host identifier (optional)—in case, this endpoint is hosted on another.
d. Display name (optional)
e. Type
f. User association (optional)—in case, device is owned-by/assigned-to a user.

Device

Device is a type of Endpoint. For example, an iPhone, a temperature sensor, a tablet are devices. A device can have certain information representing its identity. For example, network MAC, UDID etc.

Devices are primarily categorized as follows—
a. BYOD (bring your own device)—This device category represents the set of user's personal devices. The server may allow an interested user to register his personal device for accessing enterprise data. He or she may have to comply with some defined policies in order to complete registration.
b. COPE (company owned, personally enabled) Device—A corporate device has a dedicated use and generally has greater server control. It is generally provided on temporary basis to the user.

Secure Workspace

A workspace represents an endpoint running on top of a mobile device. The workspace is a controlled environment to provide access to enterprise data and applications on mobile devices. A workspace will often have its own set of restrictions and authentication requirements to safeguard enterprise content. A goal of SecureWorkspace is providing clear isolation between personal and corporate information on a mobile device.

Managed Apps

A managed app includes an application running within a hosted endpoint, or as otherwise known in the art. It can be auto-provisioned to a host. An enterprise app catalog hosts managed apps and provisioning policies define which users are entitled to what apps.

Managed apps can be widely categorized as follows—
a. Must Have Apps—There are certain apps that each registered device generally "must have" in-order to continue its access to enterprise data. Containers, single sign-on (SSO)-agents etc. may fall in this category.
b. Should Have Apps—These apps are suggested according to the user's role. There can be some apps; such as email, calendar; which are applicable to all whereas there can be apps which are applicable to a particular role: such as sales, retail, developer, quality assurance (QA), etc.
c. Nice to Have Apps—These are the apps, which are available for use but not logically related to user's role.

It is also possible that a managed app is independently registered against the Oracle MSM server; in this case, the parent/host of the managed app may or may not be registered against MSM. For example a Bank may want its customers to register the banking app with the bank's MSM instance.

Endpoint Relationships

A device can host a workspace or managed apps. A workspace can also host managed apps. An IOT gateway device can have other edge devices connected to it that may need to be managed. In all such cases the hosted endpoint can inherit properties from its parent. For example a managed app can have same Internet Protocol (IP) address as its parent.

In FIG. 6, device 602 hosts container 604. Container 604 contains managed apps 606, 608, and 610. Device 602 also hosts apps 680, 682, and 684.

Figure 7:
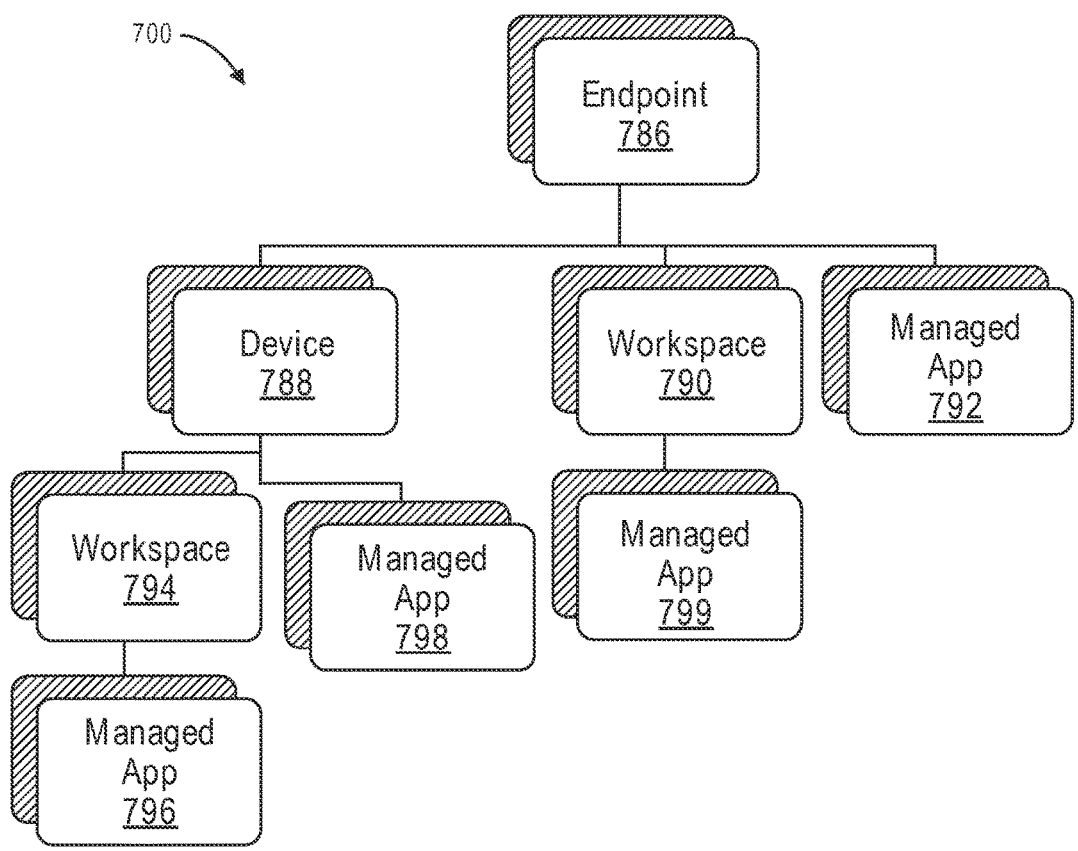
FIG. 7 illustrates a hierarchical object model in accordance with an embodiment.

FIG. 7 illustrates a hierarchical object model in accordance with an embodiment. In object model 700, endpoint 786 is at the top of a hierarchy, above device 788, workspace 790, and managed app 792. Device 788 is above workspace 794 and managed app 798, and workspace 794 is above managed app 796. Workspace 790 is above managed app 799. Note that each branch of the object model terminates with a managed app.

For an endpoint to register with an MSM, it is not pre-requisite that its parent endpoint must be registered beforehand. Hence, it is possible that an app, a workspace, or a device is managed independently. The object model would follow inheritance relationships where the host endpoint's properties are also applicable to the child. The diagram in the figure provides hierarchical possibilities of relationships between different kinds of endpoints.

Figure 8:
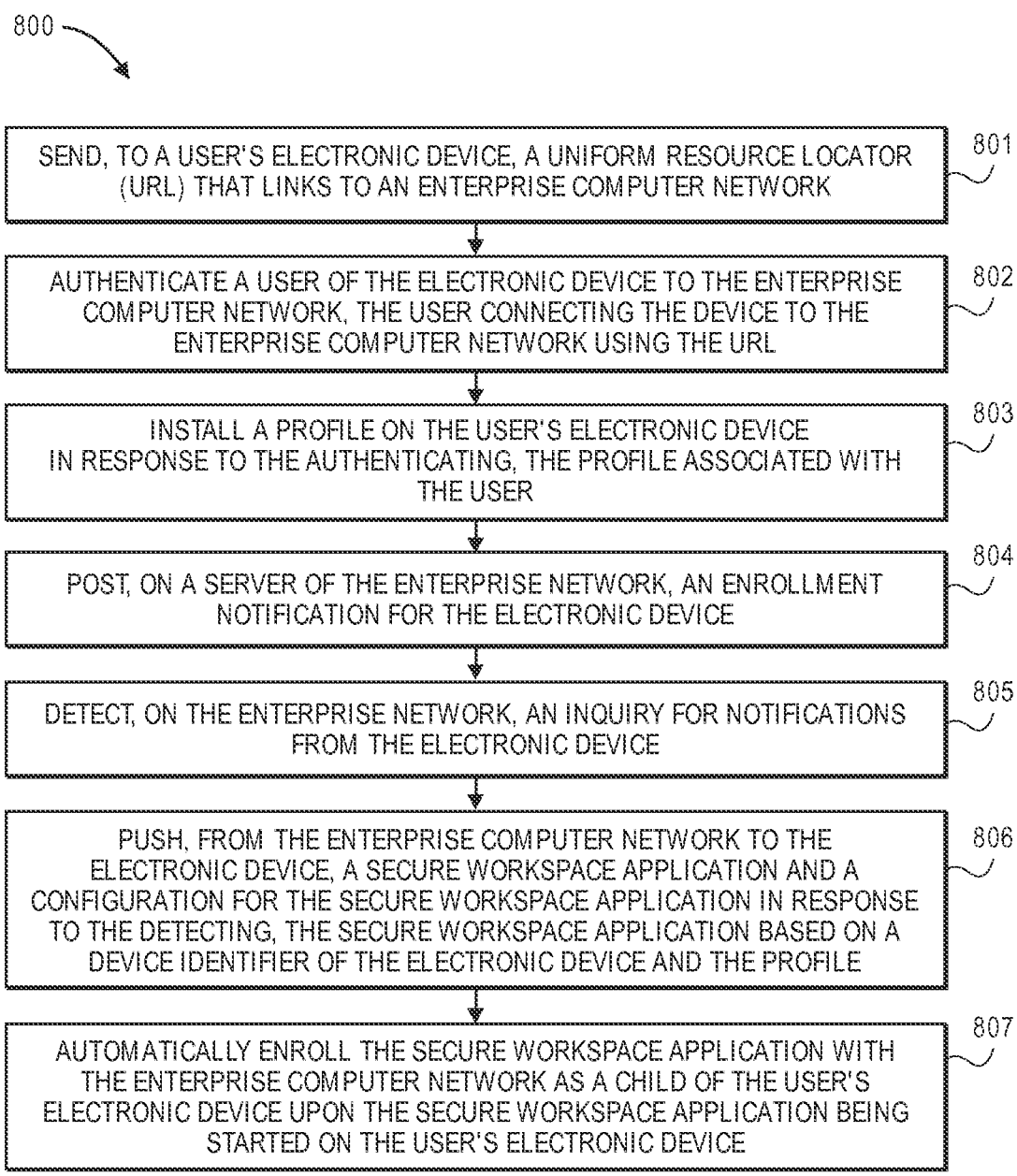
FIG. 8 is a flowchart illustrating a process in accordance with an embodiment.

FIG. 8 is a flowchart illustrating a process in accordance with an embodiment. System 800 can be implemented in one or multiple computers. In operation 801, a uniform resource locator (URL) that links to an enterprise computer network is sent to a user's electronic device. In operation 802, a user of the electronic device is authenticated to the enterprise computer network. The user connects the electronic device to the enterprise computer network using the URL. In operation 803, a profile is automatically installed on the user's electronic device in response to the authenticating. The profile is associated with the user.

In operation 804, an enrollment notification for the electronic device is posted on a server of the enterprise computer network. In operation 805, an inquiry for notification from the electronic device is detected on the enterprise network. In operation 806, a secure workspace application is downloaded from the enterprise computer network to the electronic device in response to the detecting. The secure workspace application is selected based on a device identifier of the electronic device and the profile. In operation 807, the user's electronic device is enrolled with the enterprise computer network upon the secure workspace application being launched on the user's electronic device.

Figure 9:
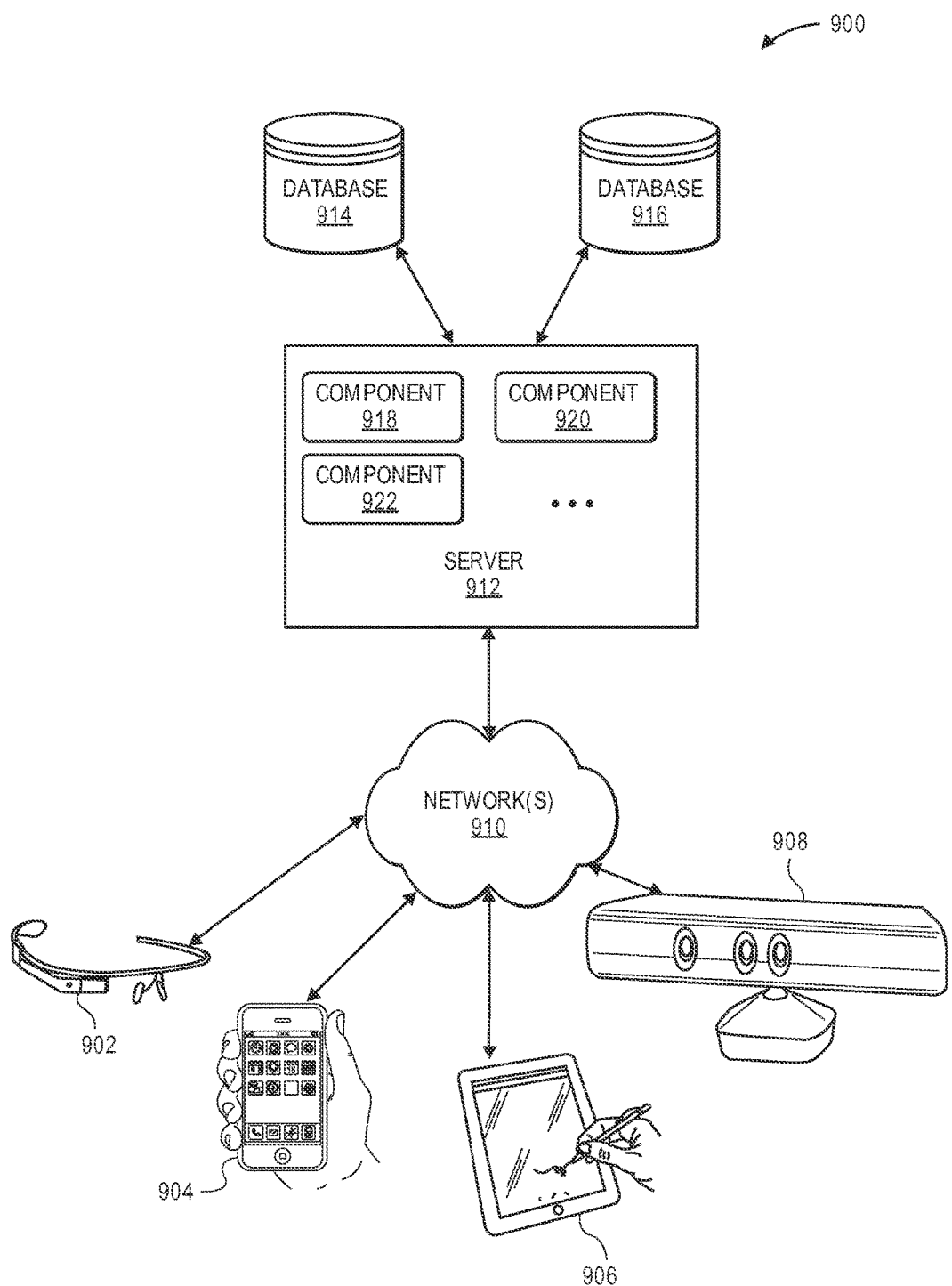
FIG. 9 depicts a simplified diagram of a distributed system for implementing one of the embodiments.

FIG. 9 depicts a simplified diagram of a distributed system 900 for implementing one of the embodiments. In the illustrated embodiment, distributed system 900 includes one or more client computing devices 902, 904, 906, and 908, which are configured to execute and operate a client application such as a web browser, proprietary client (e.g., Oracle Forms), or the like over one or more network(s) 910. Server 912 may be communicatively coupled with remote client computing devices 902, 904, 906, and 908 via network 910.

In various embodiments, server 912 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some embodiments, these services may be offered as web-based or cloud services or under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in the figure, the software components 918, 920 and 922 of system 900 are shown as being implemented on server 912. In other embodiments, one or more of the components of system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in the figure is thus one example of a distributed system for implementing an embodiment system and is not intended to be limiting.

Client computing devices 902, 904, 906, and/or 908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 902, 904, 906, and 908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 910.

Although exemplary distributed system 900 is shown with four client computing devices, any number of client computing devices may be supported. Other devices, such as devices with sensors, etc., may interact with server 912.

Network(s) 910 in distributed system 900 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 910 can be a local area network (LAN), such as one based on Ethernet, Token-Ring and/or the like. Network(s) 910 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 912 can include one or more virtual machines running virtual operating systems, or other computing architectures involving virtualization. One or more flexible pools of logical storage devices can be virtualized to maintain virtual storage devices for the server. Virtual networks can be controlled by server 912 using software defined networking. In various embodiments, server 912 may be adapted to run one or more services or software applications described in the foregoing disclosure. For example, server 912 may correspond to a server for performing processing described above according to an embodiment of the present disclosure.

Server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more databases 914 and 916. Databases 914 and 916 may reside in a variety of locations. By way of example, one or more of databases 914 and 916 may reside on a non-transitory storage medium local to (and/or resident in) server 912. Alternatively, databases 914 and 916 may be remote from server 912 and in communication with server 912 via a network-based or dedicated connection. In one set of embodiments, databases 914 and 916 may reside in a storage-area network (SAN). Similarly, any necessary files for performing the functions attributed to server 912 may be stored locally on server 912 and/or remotely, as appropriate. In one set of embodiments, databases 914 and 916 may include relational databases, such as databases provided by Oracle, that are adapted to store, update, and retrieve data in response to SQL-formatted commands.

Figure 10:
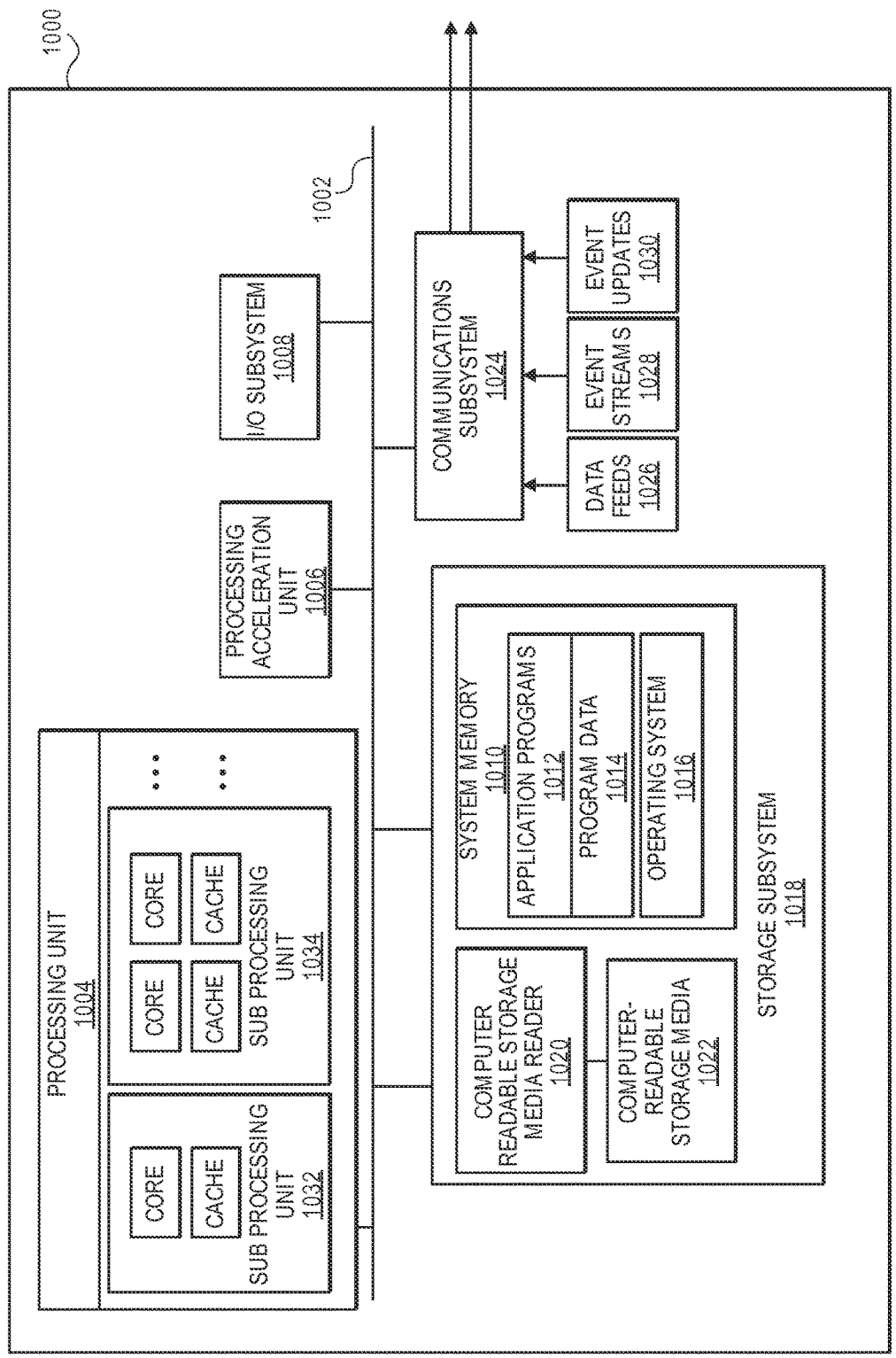
FIG. 10 illustrates an exemplary computer system, in which various embodiments of the present invention may be implemented.

FIG. 10 illustrates an exemplary computer system 1000, in which various embodiments of the present invention may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present invention.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method of initializing a user's electronic device for secure connection to an enterprise computer network, the method comprising:
    sending, to an electronic device, a uniform resource locator (URL) that links to an enterprise computer network;
    authenticating a user of the electronic device to the enterprise computer network, the user connecting the electronic device to the enterprise computer network using the URL;
    installing a profile on the electronic device in response to the authenticating, the profile associated with the user;
    posting, on a server of the enterprise computer network, an enrollment notification for the electronic device;
    detecting, on the enterprise computer network, an inquiry for notifications from the electronic device;
    pushing, from the enterprise computer network to the electronic device, a secure workspace application and a configuration for the secure workspace application in response to the detecting, the secure workspace application selected based on a device identifier of the electronic device and the profile; and
    automatically enrolling the secure workspace application with the enterprise computer network as a child of the electronic device upon the secure workspace application being started on the electronic device.

2. The method of claim 1 further comprising:
    transmitting data from the enterprise computer network to the electronic device for viewing in an app;
    decrypting, by the secure workspace application, the data; and
    passing the decrypted data to the app for viewing by the user.

3. The method of claim 1 further comprising:
    encrypting, by the secure workspace application, data from an app on the electronic device; and
    transmitting, from the electronic device to the enterprise computer network, the encrypted data.

4. The method of claim 1 further comprising:
    determining an operating system (OS) of the electronic device, wherein the secure workspace application is selected based on the determined OS.

5. The method of claim 4 wherein the automatic enrolling is based on the determined OS.

6. The method of claim 5 further comprising:
    correlating a role of the user with the OS of the electronic device, wherein the enrolling is based upon a pre-approval of the OS correlated with the role.

7. The method of claim 1 wherein the user is associated with a role in the enterprise computer network, the enrolling based upon the role.

8. The method of claim 1 wherein the sending of the URL is through a short message service (SMS) or multimedia messaging service (MMS).

9. The method of claim 1 wherein the sending of the URL is through an email to the user.

10. The method of claim 1 wherein a type of authentication for the authenticating is selected based on a policy in the enterprise computer network.

11. The method of claim 10 wherein the type of authentication includes a username and password on a hypertext transfer protocol (HTTP) web form.

12. A non-transitory computer-readable medium for initializing a user's electronic device for secure connection to an enterprise computer network, the medium comprising instructions stored thereon, that when executed on a processor, perform operations comprising:
    sending, to an electronic device, a uniform resource locator (URL) that links to an enterprise computer network;
    authenticating a user of the electronic device to the enterprise computer network, the user connecting the electronic device to the enterprise computer network using the URL;
    installing a profile on the electronic device in response to the authenticating, the profile associated with the user;
    posting, on a server of the enterprise computer network, an enrollment notification for the electronic device;
    detecting, on the enterprise computer network, an inquiry for notifications from the electronic device;
    pushing, from the enterprise computer network to the electronic device, a secure workspace application and a configuration for the secure workspace application in response to the detecting, the secure workspace application selected based on a device identifier of the electronic device and the profile; and
    automatically enrolling the secure workspace application with the enterprise computer network as a child of the electronic device upon the secure workspace application being started on the electronic device.

13. The medium of claim 12 further comprising operations for:
    transmitting data from the enterprise computer network to the electronic device for viewing in an app;
    decrypting, by the secure workspace application, the data; and
    passing the decrypted data to the app for viewing by the user.

14. The medium of claim 12 further comprising operations for:
    encrypting, by the secure workspace application, data from an app on the electronic device; and
    transmitting, from the electronic device to the enterprise computer network, the encrypted data.

15. The medium of claim 12 further comprising operations for:
    determining an operating system (OS) of the electronic device, wherein the secure workspace application is selected based on the determined OS.

16. A computer system executing instructions for initializing a user's electronic device for secure connection to an enterprise computer network, the computer system comprising:
    at least one processor; and
    a memory operatively coupled with the at least one processor, the processor executing a computer program including:
        program code for sending, to an electronic device, a uniform resource locator (URL) that links to an enterprise computer network;
        program code for authenticating a user of the electronic device to the enterprise computer network, the user connecting the electronic device to the enterprise computer network using the URL;
        program code for installing a profile on the electronic device in response to the authenticating, the profile associated with the user;
        program code for posting, on a server of the enterprise computer network, an enrollment notification for the electronic device;

program code for detecting, on the enterprise computer network, an inquiry for notifications from the electronic device;

program code for pushing, from the enterprise computer network to the electronic device, a secure workspace application and a configuration for the secure workspace application in response to the detecting, the secure workspace application selected based on a device identifier of the electronic device and the profile; and program code for automatically enrolling the secure workspace application with the enterprise computer network as a child of the electronic device upon the secure workspace application being started on the electronic device.

17. The system of claim 16 further comprising:
program code for transmitting data from the enterprise computer network to the electronic device for viewing in an app;

program code for decrypting, by the secure workspace application, the data; and program code for passing the decrypted data to the app for viewing by the user.

18. The system of claim 16 further comprising:
program code for encrypting, by the secure workspace application, data from an app on the electronic device; and program code for transmitting, from the electronic device to the enterprise computer network, the encrypted data.

19. The system of claim 16 further comprising:
program code for determining an operating system (OS) of the electronic device, wherein the secure workspace application is selected based on the determined OS.

20. The system of claim 19 further comprising:
program code for correlating a role of the user with the OS of the electronic device, wherein the enrolling is based upon a pre-approval of the OS correlated with the role.

* * * * *

UNITED STATES PATENT AND TRADEMARK OFFICE
CERTIFICATE OF CORRECTION

PATENT NO.        : 9,781,098 B2
APPLICATION NO.   : 14/689983
DATED             : October 3, 2017
INVENTOR(S)       : Mohamad Abdul et al.

It is certified that error appears in the above-identified patent and that said Letters Patent is hereby corrected as shown below:

On page 3, Column 1, under Other Publications, Line 1, delete "Interational" and insert -- International --, therefor.

Signed and Sealed this
Twenty-ninth Day of May, 2018

Andrei Iancu
*Director of the United States Patent and Trademark Office*